United States Patent Office 3,477,569
Patented Nov. 11, 1969

3,477,569
VORTEX TYPE SEPARATOR AND COLLECTOR SYSTEM
Heinrich Klein, Erlangen, Eduard Weber, Nuremberg, Rudolf Pieper, Erlangen, and Alfred Hoffmann, Forchheim, Germany, assignors to Siemens Aktiengesellschaft, a corporation of Germany
Filed Mar. 18, 1966, Ser. No. 535,491
Claims priority, application Germany, Mar. 18, 1965, S 96,027
Int. Cl. B04c *3/04, 3/00*
U.S. Cl. 209—144       5 Claims

ABSTRACT OF THE DISCLOSURE

Apparatus for analyzing grain size of dust-like particles entrained in a gaseous medium includes a plurality of toronado-flow vortex separators connected to one another and respectively having a main inlet at one end and outlet at the other end. A pre-twist nozzle is located in the main inlet of each separator for imparting a twist to the medium supplied to the separator. Auxiliary inlet means communicating with the interior of a cylindrical enclosure included in each separator have a flow direction tangential to the enclosure wall and inclined to the enclosure axis for causing auxiliary gas flow to excite particle-separating circulatory motion in the main flow. The auxiliary inlet means of each separator has a total cross section different from that of the other separators.

---

Our invention relates to apparatus for analyzing grain sizes of fine-granulated or dust-like particles.

Accurate knowledge of the granular composition of dusts or other fine-granular materials is of great importance for many industrial purposes. It is particularly applicable to the field of dust removal, since the possibility must often be considered of separating the granular constituents of a dust by means of some dust removal process. For this purpose, grain-size analyses of the dust are made. A great number of methods are known generally for accomplishing this. A prerequisite for such analyses is the procurement of a sufficient quantity of dust, that is, the collection of dust specimens. Analysis methods employed heretofore in industry have the disadvantage, however, that the dust does not pass directly to the analyzer from the gaseous carrier medium in the form in which it was originally constituted. In most cases, due to agglomeration or other effects such as electrostatic charges, moisture and the like, a change in the constitution of the dust occurs so that the results of the subsequent grain-size analysis, in many cases do not represent the original condition of the dust.

The accurate composition of the dust with regard to grain size can be determined only by grain-size analysis applied directly to the dust in its original condition. For this reason, a sample taken from the carrier medium, which is usually gaseous, must pass directly into the analyzer wherein the dust is classified according to grain size.

It is accordingly an object of our invention to avoid the aforementioned difficulties of the heretofore known dust grain-size analysis methods and apparatus by providing grain-size analyzing apparatus wherein the particles are measured in their original condition.

With the foregoing and other objects in view, we provide apparatus for analyzing the grain size of granular or dust-like particles which includes a plurality of vortex separators of the type known as "tornado-flow" separators. Separators of this type are designed and operated on a principle that involves so-called "relative forces" that occur in flowing media subjected to a rotational flow having a potential-flow component and a circulatory-flow component and resulting in vortex source and sink formation within the separator vessel. The physical principles of this type of separation and the forces resulting from the just-mentioned flow phenomena are explained in Patent No. 3,199,268 to Oehlrich et al., as well as in the subsequently issued Patents Nos. 3,199,269 to 3,199,272, inclusive, for example. With the "tornado flow" employed in the vortex separator, a potential circulatory flow is excited and maintained in and adjacent the wall of a rotationally symmetrical vortex chamber so that in addition to the circulatory movement it effects a movement in the axial direction of the vortex chamber in opposition to the flow of the gas sample or specimen centrally into the vortex chamber from an end thereof. A component of this potential circulatory flow is diverted at the level of the gas specimen inlet toward the axis of the vortex chamber and is transformed together with the gas specimen into a coaxial rotational flow circulating within the potential circulatory flow in the same rotary direction. The occurring flow phenomena impose a strong separating force upon the particles entrained in the gas specimen and these particles collect in a rotating dust ring from which they are discharged radially out of the rotational flow and conveyed through a branch of the outer oppositely directed potential circulatory flow into an outlet for the particles, which surrounds the gas specimen inlet and, finally, to a collector receptacle, while the clear gas now devoid of particles discharges from the vortex chamber through an outlet in the other side of the vortex chamber. As aforementioned, a heretofore known separator employing the tornado-flow principle, such as is disclosed, for example in the abovementioned Patent No. 3,199,272, produces the potential circulatory flow by introducing an auxiliary flow of a gaseous medium which joins the main gas flow at an acute angle to the axis of the main flow and in a generally tangential direction to the vortex chamber.

More specifically, in accordance with our invention, we thus connect the plurality of tornado-flow vortex separators either in series or in parallel, each of the tornado flow separators being provided with a separate collecting receptacle. Furthermore, the tornado flow separators differ from one another in the specific number and/or size of their respective inlet channels for the auxiliary flow of gaseous medium depending upon the particular predetermined classification by grain size limits.

In accordance with a further feature of the invention, the tornado flow separators are arranged in series by being connected one after the other in a column so that each tornado-flow separator outlet for gaseous medium, which is laden with the particle quantity not yet separated therefrom, forms the tornado flow separator inlet of the next following separator, the full amount of particle-laden carrier medium specimen being supplied to the lowermost tornado flow separator.

In accordance with another feature of our invention, the tornado flow separators connected in parallel are provided with a common particle-laden carrier medium inlet which is uniformly subdivided so that substantially similar amounts of the particle-laden carrier medium are conveyed to the individual tornado flow separators. As an additional feature, we provide means for applying a twist to the carrier medium entering each of the individual tornado flow separators.

The features which are considered as characteristic for the invention are set forth in the appended claims.

While the invention has been illustrated and described as embodied in apparatus for analyzing grain sizes of fine-granulated or dust-like particles, it is not intended to be limited to the details shown, since various modifications and structural changes may be made therein without departing from the spirit of the present invention and within the scope and range of equivalents of the claims.

The invention, however, both as to its construction and method of operation, together with additional objects and advantages thereof, will be best understood from the following description of specific examples when read in connection with the accompanying drawings, in which.

Figure 1:
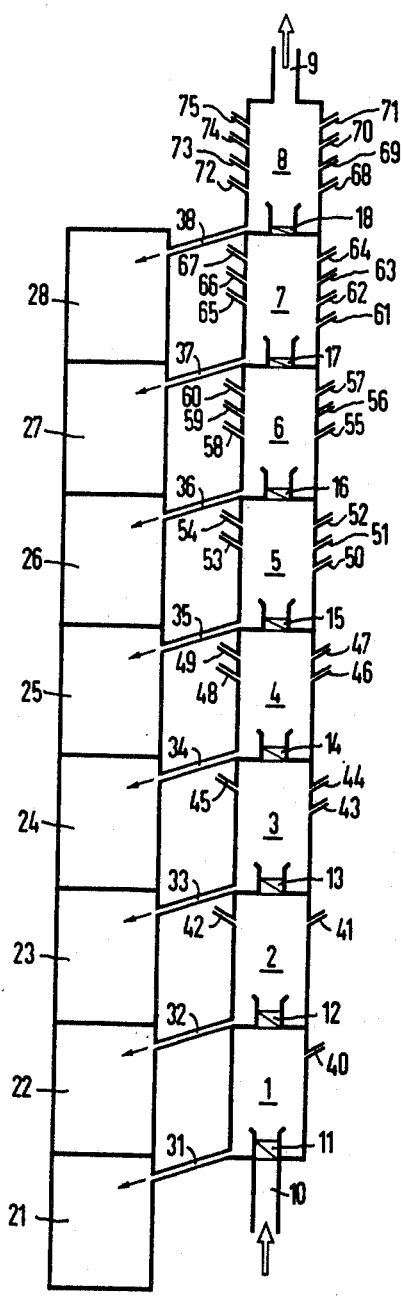
FIGS. 1 and 2 are diagrammatic views of the apparatus for analyzing grain sizes in accordance with our invention having a plurality of tornado flow separators arranged, respectively, in series and in parallel.

Referring now to the drawings and first particularly to FIG. 1 thereof, there is shown apparatus for analyzing grain sizes comprising eight serially arranged tornado flow separators 1 to 8. With the aid of a suitable probe or sounding device (not shown), a component specimen flow taken from the particle-laden primary gas flow which is to be analyzed is conducted through an inlet 10 and a pre-twist nozzle 11, provided, for example, with a helical guide vane which imparts a twist thereto, into the lowermost separator 1. Excitation of the potential circulatory flow occurs in the tornado flow separator 1 due to the admission of an auxiliary gas flow through a single inlet channel 40 located so that the auxiliary flow joins the main gas flow at an acute angle to the axis of the main flow and in a generally tangential direction to the wall of the separator. In this first separator, all particles that are larger than a pre-determined limit grain size are separated and are conducted by a component flow of the auxiliary flow medium supplied through the inlet channel 40 into a collector receptacle 21 through an outlet 31 at the base of the separator 1. The gas flow specimen augmented by the auxiliary flow medium passes through the next inlet provided with a pre-twist nozzle 12 into a second tornado flow separator 2. The larger quantity of gas experiences in the inlet to the tornado flow separator 2 an increased twisting by the pre-twist nozzle 12 and an increased excitation of the potential circulatory flow due to the provision of two auxiliary flow medium inlet channels 41 and 42 having similar relationships to the main flow axis and the separator as does the inlet channel 40 to the main flow axis and the wall of the separator 1 as aforedescribed. Due to this increased excitation, particles are consequently separated which are smaller than those removed from the preceding tornado flow separator 1. The particles separated in the separator 2 are conducted through an outlet 32 to a collector receptacle 22.

The aforedescribed separating process is then repeated in the next-following tornado flow separators 3 to 8 in a similar manner. In each succeeding tornado flow separator, the quantity of gas experiences another increased pre-twisting due to the pre-twisting nozzles 13 to 18, respectively, formed with substantially helical flow paths of increased pitch, and experiences an increased excitation of potential circulatory flow due to the respective increasing number of inlet channels 43–45, 46–49, 50–54, 55–60, 61–67, in separators 3 to 7, up to finally eight inlet channels 68–75 in the last tornado flow dust separator 8. It is, of course, considered to be within the scope of the invention, even if succeeding separators are provided merely with one or more inlet channels, that only the aggregate cross section of the inlet channels of each of the separators be of increasing size from separator 1 to separator 8.

The dust remainder discharging from the last tornado flow separator 8 (if dust components are present which are even finer than the limit grain size of the last separator stage) is conducted through the outlet 9 into a conventional filter bag of web material or the like. (Although a filter bag of this conventional type is not shown in FIG. 1, it is illustrated and described with respect to the diagrammatic view of the embodiment shown in FIG. 2.) After the specimen gas flow has been cut off, the dust quantities deposited in the individual collector receptacles 21 and 28 are then weighed. From the dust quantities contained in the individual collector receptacles, the grain size distribution curve or residue quantity curves can be obtained in a conventional manner.

With the aforedescribed series connection of tornado flow separators, the dust component of the particle sizes between the limit grain sizes of the respective tornado flow separator stage as well as the preceding separator stage, that is the fractional constituent, is obtainable directly in percentage by weight.

Figure 3:
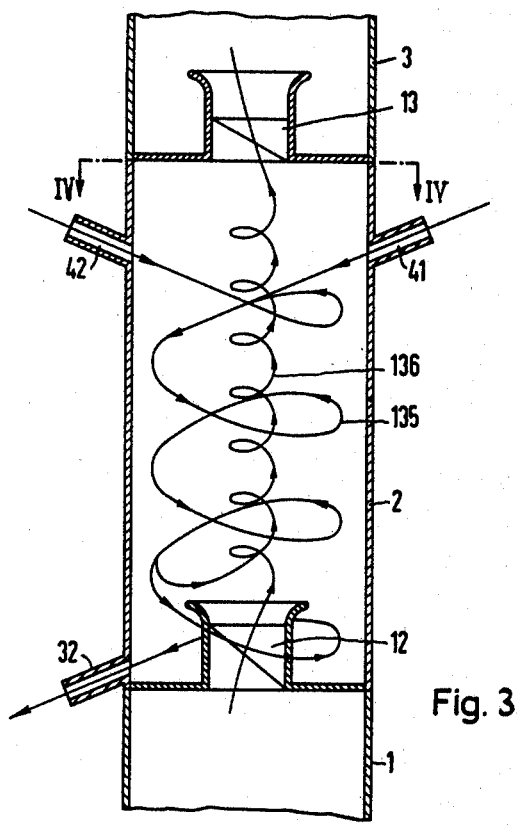
FIG. 3 is an enlarged view of one of the tornado flow separators of FIG. 1.

In FIG. 3 there is presented an enlarged view of the circulatory flow 135 at the bottom of the separator chamber 2 through an outlet 32 into a collector receptacle 22 (FIG. 1).

The tornado flow is excited to such an extent in the separator chamber 2 that only particles greater than a specific size are separated. The remaining smaller particles flow with the axial rotational flow 136 through the pre-twisting nozzle 13 into the next separator chamber 3, wherein a greater excitation of the tornado flow is produced with consequent separation of still smaller particles.

Figure 2:
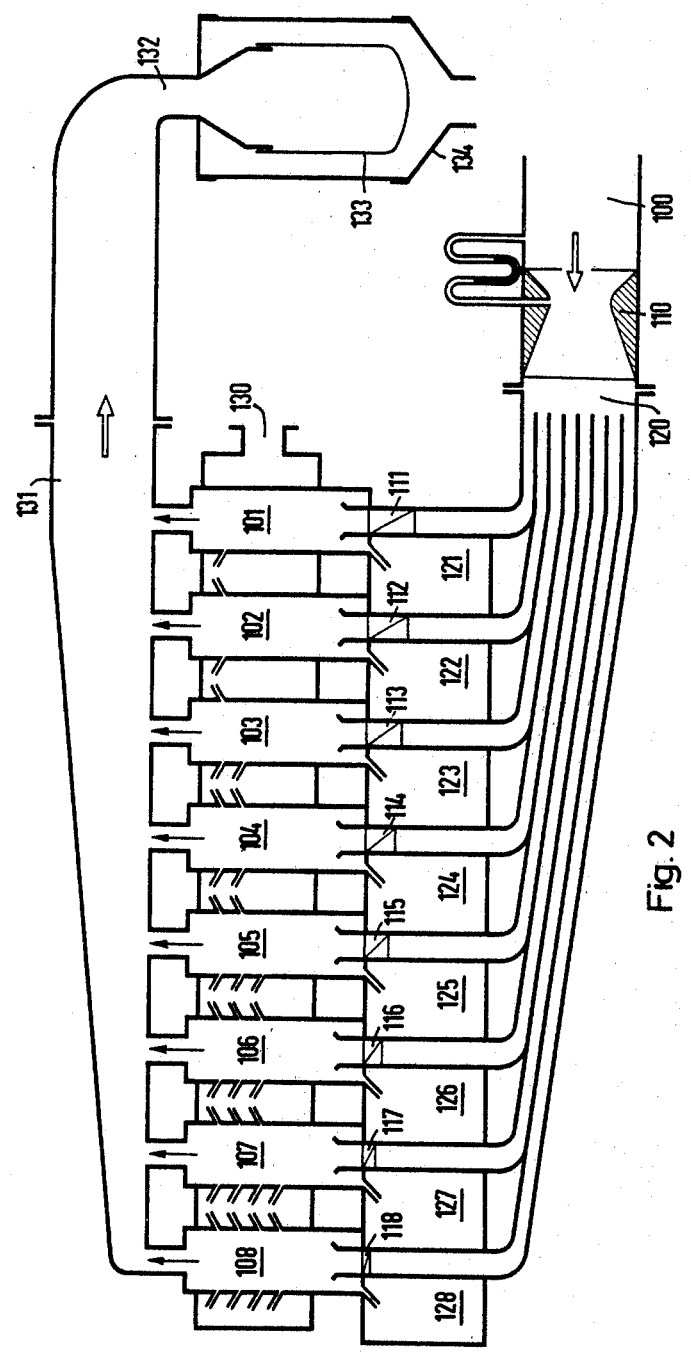
Figure 4:
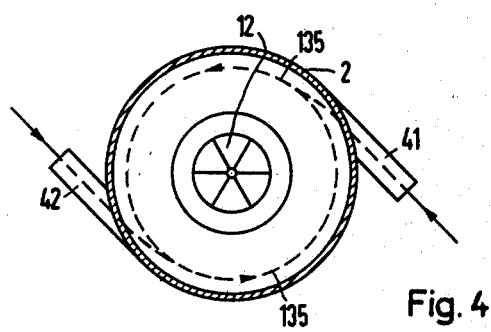
FIG. 4 is a sectional view of FIG. 3 taken along the line IV—IV in the direction of the arrows.

In FIG. 2, there is shown an apparatus for analyzing grain size having, for example, eight tronado flow separators 101 to 108 connected in parallel, each having a respective pre-twist nozzle 111 to 118 and a separate collector receptacle 121 to 128. The gaseous auxiliary flow medium passing through the inlet channels in the sides of the respective tornado flow separators is drawn from a common air or gas regulator chamber 130 of a pump, for example. Excitation of the potential circulatory flow occurs in the same separator 2 shown in the series arrangement of FIG. 1. The gas laden with dust particles discharges from the separator chamber 1 through the pre-twisting nozzle 12 into the separator chamber 2. Auxiliary flow medium inlet channels or nozzles 41 and 42 are disposed in the upper region of the separator chamber 2 tangentially and inclined in an opposite direction to the rising flow of dust-laden gas, as further shown in the cross sectional view of FIG. 4. A potential circulatory flow 135 is produced in the region of the vortex chamber 2 adjacent the wall thereof due to the auxiliary gas flowing inwardly through the auxiliary inlet nozzles 41 and 42. The dust-laden gas thereby traverses the separator chamber 2 in the form of a rotational flow 136 from the bottom of the top of the chamber 2, as viewed in FIG. 3, due to the effect of the pre-twisting nozzle 12. The rotational direction of the outer potential circulatory flow 135 and the inner rotational flow 136 is thus the same.

Due to the fact that the pre-twisting nozzle 12 has a greater inclination than that of the nozzle 10 (FIG. 1) and due to the increased number of auxiliary gas inlets 41 and 42 in separator 2 as compared to the single inlet 40 of the separator 1 (FIG. 1), a tornado flow of greater rotational velocity is produced in the separator 2 than in the separator 1. The dust particles still entrained in the gas passing through the pre-twisting nozzle 12 and supplied into the separator chamber 2 are thereby flung outwardly in a direction toward the wall of the separator 2 on the inner rotational flow 136 and are entrained by the downwardly directed potential circulatory flow 135. The thus separated dust particles are carried by a branch of the potential manner as for the apparatus disclosed in FIG. 1 and hereinbefore described, namely due to respective inlet channels for the auxiliary flow medium in the individual tornado flow separators, the number (or aggregate cross section) of the inlet channel varying from one to the other tornado flow separators. The particle-laden flow quantity taken as a specimen from the main gas flow which is to be analyzed is metered in an inlet 100, for example by means of a Venturi measuring nozzle 110 and associated manometer, and uniformly distributed to the individual tornado flow separators by means of suitable partitions in the connecting inlet pipe 120. After the particles, smaller than the respective limit grain size, have been sorted or separated in the individual tornado flow separators, the gas flow remainder with the finest particles, if any, still entrained therein is conducted through a manifold 131 to an outlet 132 common to all of the tornado flow separators, and the remainder dust quantity is collected in a filter bag 133 connected to the outlet 132. The gaseous carrier medium then discharges through the outlet 134 of the filter chamber in which the filter bag 133 is located.

With the parallel arrangement, each collector receptacle thus receives the entire quantity of particles that are larger than the limit grain size of the respective tornado flow separator out of the dust quantity which is admitted into the respective tornado flow separator. For evaluating the obtained measurements it is necessary furthermore to know the amount of the dust quantities supplied to the individual tornado flow separators, which can be obtained in various ways. With uniform distribution of the particle-laden gas flow to the individual tornado flow separators, it is sufficient to collect and measure in a known manner the dust quantity discharging from the entire apparatus. The entire quantity of dust supplied to the apparatus is obtained as the sum of the collected quantity discharging from the entire apparatus, i.e. present in the filter bag 133, and the dust quantities depositing in the collector receptacles 121 to 128. The dust quantities supplied to each of the tornado flow separators can thus be evaluated therefrom.

Uniform distribution of the dust-laden gas flow to the individual tornado flow separators is unnecessary, however, if a filter bag is provided at the outlet of each of the tornado flow separators for collecting the dust quantities discharging from each of the respective individual tornado flow separators, since that quantity and the quantity of particles, having the grain-size limit for the respective separator, which is deposited in the respective receptacle both add up to the total dust quantity admitted to that separator. In such a case, also, a Venturi measuring nozzle 110 can be provided in each of the supply conduits to the individual tornado flow separators.

Naturally, the apparatus is not limited to a serially or parallel-connected arrangement of eight tornado flow separators. Depending upon the requirements as to the accuracy of the measurement and to the amount of the grain-size stages to be measured, the number of serially or parallel-connected tornado flow separators can be larger or smaller, and the graduated variations or stagings of pre-twisting or of the quantity of flow and/or cross section of the inlet channels for the auxiliary flow medium of the separators can also be greater or smaller, as necessary.

We claim:
1. Apparatus for analyzing the grain size of fine-granular or dust-like particles entrained in a gaseous medium, comprising a plurality of tornado-flow vortex separators connected to one another and adapted to receive respectively a portion of a particle-entrained gaseous medium specimen, each of said separators including a cylindrical enclosure having a main inlet substantially at one end thereof for a main flow of the specimen portion and an outlet at the other end thereof, a pre-twist nozzle in the main inlet to each of said separators for imparting a twist in a given rotary direction to the particle-entrained gaseous medium supplied to said separators, auxiliary inlet means for supplying an auxiliary gas flow communicating with the interior of said enclosure, said auxiliary inlet means having a flow direction substantially tangential to the wall of said cylindrical enclosure and inclined at an acute angle to the axis of said enclosure for causing the auxiliary gas flow to excite particle-separating circulatory motion in said given rotary direction in the main flow of the specimen portion, a receptacle communicating with said interior of said enclosure at said one end thereof for receiving the particle material separated from the specimen portion, the pre-twist nozzle in the main inlet to each of said separators having a helical flow path of pitch varying from that of the main inlets of the other separators so that the main flow of the specimen portion in each of said separators is different from the main flow in the other separators, and the auxiliary inlet means of each of said separators having a total cross section varying from that of the other separators so that the flow of auxiliary gas in each of said separators is different from the others whereby particles of different predetermined limit grain size are separated from the main flow of the specimen portions in the respective separators.

2. Apparatus according to claim 1, wherein the auxiliary inlet means of one of said separators comprises at least one inlet nozzle and the auxiliary inlet means of the other separators each comprises an increasingly greater number of inlet nozzles.

3. Apparatus according to claim 1, wherein said separators are connected in series and in a substantially vertical column, the outlets of each of said separators, except for the uppermost separator, forming the inlet of the respective next succeeding separator, whereby the specimen portion passing into each of said separators, except the lowermost separator, contains a quantity of particles less an amount thereof separated below the respective separator, the lowermost separator being supplied with the entire specimen of particle-entrained gaseous medium.

4. Apparatus according to claim 1, wherein said separators are connected in parallel and have a common supply conduit, said conduit being subdivided by partitions into separate supply paths of equal flowthrough cross section for passing a uniform distribution of the particle-entrained gaseous medium to each of said separators.

5. Apparatus according to claim 1, wherein said pre-twist nozzles are formed with substantially helical flow paths having respectively increased pitch for imparting increased twist to the particle-entrained gaseous medium supplied to the respective separators approximately in proportion to the degree of excitation of the particle-separating circulatory motion in the main flow imparted by the auxiliary gas flow supplied through the auxiliary inlet means of the respective separators.

References Cited

UNITED STATES PATENTS

| 2,439,850 | 4/1948 | Heller | 55—347 X |
| 2,917,374 | 12/1959 | Wood. | |
| 3,039,608 | 6/1962 | Wikdahl | 209—211 |
| 3,166,496 | 1/1965 | Kelsall | 209—211 |
| 3,199,269 | 8/1965 | Oehlrich et al. | 55—261 |
| 3,199,270 | 8/1965 | Oehlrich | 55—261 |
| 3,261,467 | 7/1966 | Wikdahl | 209—211 |

FOREIGN PATENTS 752,353   7/1956   Great Britain.

FRANK W. LUTTER, Primary Examiner